(12) United States Patent
Schoenbauer et al.

(10) Patent No.: US 10,020,522 B2
(45) Date of Patent: Jul. 10, 2018

(54) ENERGY SYSTEM HAVING A FUEL CELL ARRANGEMENT

(71) Applicant: Robert Bosch GmbH, Stuttgart (DE)

(72) Inventors: Stefan Schoenbauer, Ditzingen (DE); Nils Kaiser, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 276 days.

(21) Appl. No.: 14/294,490

(22) Filed: Jun. 3, 2014

(65) Prior Publication Data

US 2014/0356745 A1 Dec. 4, 2014

(30) Foreign Application Priority Data

Jun. 3, 2013 (DE) .................. 10 2013 210 221

(51) Int. Cl.
*H01M 8/04* (2016.01)
*H01M 16/00* (2006.01)
*H01M 8/04007* (2016.01)

(52) U.S. Cl.
CPC ..... *H01M 8/04037* (2013.01); *H01M 16/003* (2013.01)

(58) Field of Classification Search
CPC .................. H01M 8/04037; H01M 16/003
USPC .................................. 429/429–436
See application file for complete search history.

(56) References Cited

U.S. PATENT DOCUMENTS

| 7,078,116 | B2 * | 7/2006 | Enjoji | H01M 8/04007 429/429 |
| 2003/0118876 | A1 * | 6/2003 | Sugiura | B60L 11/1887 429/9 |
| 2007/0054166 | A1 * | 3/2007 | Ojima | H01M 8/0441 429/408 |

FOREIGN PATENT DOCUMENTS

JP 2004-127758 * 4/2004 .............. H01M 8/04

* cited by examiner

*Primary Examiner* — Osei K Amponsah
(74) *Attorney, Agent, or Firm* — Michael Best & Friedrich LLP

(57) ABSTRACT

An energy system having a fuel cell arrangement, wherein the fuel cell arrangement has at least one fuel cell and the fuel cell arrangement has at least one first electrical contact and at least one second electrical contact for tapping off electrically generated energy of the fuel cell arrangement. An electrical component for warming up the fuel cell arrangement is electrically connectable between the first electrical contact and the second electrical contact. At least some of the electrical energy flow which is necessary to release the thermal energy can be fed back to the energy system by the electrical component.

9 Claims, 2 Drawing Sheets

ENERGY SYSTEM HAVING A FUEL CELL ARRANGEMENT

BACKGROUND OF THE INVENTION

The present invention relates to an energy system having a fuel cell arrangement. The invention also relates to a method for using generated electrical energy of an energy system.

Energy systems having a fuel cell arrangement, in particular for automotive use, may be in a low-temperature environment, in particular well below freezing point, during their startup. In order to avoid damaging the energy system, in particular the fuel cell arrangement, during startup, it is known to precede normal operation of the fuel cell arrangement with a heat-up phase. In said heat-up phase of the startup process, an electrical resistor is usually connected to the energy system, wherein an electrical current flows through the electrical resistor. The electrical current is converted into heat by means of the resistor, wherein the heat is output to the environment or to the cooling system. In addition, the energy system, in particular the fuel cell arrangement, also warms up owing to the electrical current flowing, wherein the fuel cell arrangement has at least one fuel cell. However, it has proven to be disadvantageous that the efficiency of the energy system is reduced by the dissipation of heat by the electrical resistor.

SUMMARY OF THE INVENTION

It is therefore an object of the invention to provide an energy system, wherein the energy system is designed in a simple and cost-effective manner, and in particular such that the efficiency of the energy system is increased. It is also an object of the invention to improve cold or frozen startup of the energy system, wherein, in particular, an improved use of the required frozen-startup energy is achieved in order to increase the efficiency.

To achieve said object, an energy system having a fuel cell arrangement having the features of patent claim 1 and a method having the features of patent claim 7 are proposed, in particular having the features of the respective characterizing parts. Preferred developments are set forth in the dependent claims. In this case, the features mentioned in the claims and in the description can be essential to the invention in each case on their own or in combination. Of course, features and details which are described in connection with the energy system according to the invention also apply in connection with the method according to the invention, and vice versa.

In the case of the energy system according to the invention, it is provided that an electrical component for warming up the fuel cell arrangement is electrically connectable between the first electrical contact and the second electrical contact, wherein at least some of the electrical energy flow which is necessary to release the thermal energy can be fed back to the energy system by the electrical component. This avoids a situation whereby the electrical energy flow which is necessary to release the thermal energy is predominantly lost.

The essence of the invention lies in effective utilization of the generated energy of the fuel cell arrangement for heating same. In this case, the converted electrical energy can be supplied as additional heat to the fuel cell arrangement by the electrical component. In the simplest case, an electrical resistor can be used as electrical component, wherein the generated heat, which is generated by a flow of electrical current through the electrical resistor, can be supplied to the fuel cell arrangement. Hence, the generated heat of the electrical resistor is not transferred to the environment in an uncontrolled manner; rather, it is supplied to the fuel cell arrangement for heating purposes. In this case, the electrical component can be arranged at the fuel cell arrangement. The transfer of the output heat by the electrical component to the fuel cell arrangement can in this case involve the use of a housing, in which the fuel cell arrangement and the electrical component are arranged. Thus, the housing can be used as thermal insulator with respect to the environment. This offers the advantage that the electrical heat is stored in the housing in a manner insulated from the environment of the housing by means of the housing and can be output to the fuel cell arrangement. Accordingly, two effects are used. Firstly, the heating of the fuel cell arrangement, in particular each individual fuel cell of the fuel cell arrangement, during operation and, secondly, the transferred heat of the electrical component, in particular a resistor, into the housing, in which the fuel cell arrangement and the electrical component are arranged.

A preferred embodiment provides that the energy required for warming up the fuel cell arrangement is fed back by the electrical component in a substantially heat-free manner. Since the heating of the fuel cell arrangement can take place solely by the operation of the fuel cell arrangement, it can be provided that at least one electrical component is used to operate the fuel cell arrangement during a frozen startup, which at least one electrical component acts in a substantially heat-free manner during operation of the electrical component by the fuel cell arrangement. This offers the advantage that the design of the entire energy system having the fuel cell arrangement can be embodied in a simple manner, since an arrangement of the electrical component with an intended heat transfer from the electrical component to the fuel cell arrangement, for example through the housing, can be omitted. In this respect, the electrical component can be arranged outside a possible heat transfer from the electrical component to the fuel cell arrangement. In this way, it is conceivable that the electrical component is an electric motor which converts the supplied electrical energy into rotational energy. In order to store the rotational energy, a flywheel can be used in this case.

It is also advantageous that the electrical component has at least one energy store, in particular a capacitor or a double-layer capacitor. Capacitors offer the advantage that they can be charged electrically. In this case, the capacitors are charged electrically in an almost loss-free manner. However, since any electronic and/or electrical component has an internal resistance, a slight heat loss is produced in the case of electrical charging of the capacitor. Said slight heat loss, caused by an internal resistance of the electrical component, will not continue to be taken into account for the following considerations within this document, however. Double-layer capacitors can be charged to rated voltages of from 2.5 V to 2.7 V. In order to achieve relatively high voltages, the energy stores can be connected in series. Accordingly, a voltage of 12 V can be applied to a series circuit of, for example, five energy stores having a rated voltage of 2.4 V.

It is also conceivable for the electrical component to be connectable to and disconnectable from the fuel cell arrangement in terms of energy by means of at least one switch. The fuel cell arrangement can have a high-voltage side, wherein the high-voltage side can be produced by a plurality of fuel cells which can be connected in series. This is done via a series circuit of a plurality of fuel cells, with the result that a voltage of almost any magnitude can be produced by means of the series-connected fuel cells. In this case, the electrical component can have a specific rated voltage which represents the maximum voltage at which said component may be operated. In this case, the rated voltage of the electrical component can be, for example, in a voltage range of from 1 V to 5 V. Since capacitors can be used, in particular, it is therefore advantageous for the capacitors to be able to be isolated from the high-voltage side of the fuel cell arrangement when the rated voltage of the capacitors is reached. The isolation can be enabled by means of the switch. The energy system having the fuel cell arrangement produces a direct current. The capacitor has a very low resistance value in the discharged state, wherein said capacitor can be considered to be a short circuit when the capacitor is first connected to the energy system. In the course of charging the capacitor with electrical energy, the resistance increases, as a result of which the voltage across the capacitor also increases as a function of the resistance of the capacitor. In this case, the resistance of the capacitor is therefore dependent on time. Initially, the capacitor acts as a short circuit at the instant t=0 s when a DC voltage is applied. As a result, an infinitely high current would theoretically flow when an ideal energy source is applied. In order to limit said current, use can be made of a series resistor, which can be connected in series with the capacitor. When the capacitor is being charged, the capacitor reaches an increasingly high voltage, with the result that the voltage difference between fuel cells and capacitor shrinks, wherein the current continuously decreases over time. Since the high-voltage side of the energy system having the fuel cell arrangement can amount to over 100 V, it is therefore expedient to decouple the capacitor in terms of energy from the high-voltage side of the fuel cell arrangement by means of the switch, for example when the rated voltage of 2.4 V of the capacitor is reached. Hence, destruction of the capacitor by overcharging with electrolyte decomposition by the connected high-voltage side of the fuel cell arrangement at the capacitor can be effectively prevented.

It is particularly advantageous that at least two energy stores are connectable in series by means of a circuit arrangement in order to increase an outputtable voltage and/or two electrical components are connectable in parallel by means of the circuit arrangement between the first electrical contact and the second electrical contact. Accordingly, the capacitance can be increased by a parallel circuit of at least two energy stores. Hence, a plurality of parallel-connected energy stores can be charged by the fuel cell arrangement during frozen startup, as a result of which more heat losses of the fuel cell arrangement can be produced. In order to increase the electrical voltage which can be applied to the energy stores, said energy stores can be connected in series. Thus, in a combined parallel and series circuit, both the voltage which can be applied can be increased at the entire arrangement of the energy store and the total capacitance can be increased.

In another preferred development, it is provided that the electrical component has an air compressor, wherein the air compressor is usable for operating the fuel cell arrangement. The air compressor is necessary for operating the fuel cell arrangement. Hence, the electrical component can be used for operating the fuel cell arrangement, wherein, at the same time, the fuel cell arrangement is heated by the operation of the electrical component as air compressor. Hence, the output electrical energy of the fuel cell arrangement can be fed back to the energy system effectively.

The object according to the invention is likewise achieved by means of a method for using generated electrical energy of an energy system, wherein the energy system is configured according to the disclosed energy system within this document. For this purpose, the invention provides that the electrical component is electrically conductively connected to the fuel cell arrangement by means of the switch. In this case, an electrical voltage is detected at the electrical component by a measuring device. At a specific electrical voltage, the electrical component is disconnected in terms of energy from the fuel cell arrangement by means of the switch. As a result, destruction of the electrical component owing to an applied voltage which is too high above the rated voltage of the electrical component can be prevented. When using the electrical component as an energy store, in particular a capacitor or a rechargeable battery, the destruction of the energy store can be prevented effectively as a result. This method also offers the advantage that spontaneous combustion of the energy store owing to an excessively high development of heat of the energy store used resulting from overcharging of the energy store can be prevented. It is particularly advantageous for the electrical component to have at least two capacitors, wherein the capacitors are connected in parallel with the fuel cell arrangement and, in the case of isolation in terms of energy from the fuel cell arrangement by means of the switch, the parallel-connected capacitors are connected in series by means of a circuit arrangement. Hence, during initial startup, for example, during frozen startup, of the fuel cell arrangement, the electrical components, in particular the energy stores, can be connected in parallel, wherein more heat losses are produced by the fuel cell arrangement, since the flow of current increases. In order to discharge the energy stores, said energy stores can be connected in series, as a result of which the voltage which can be output by the charged energy stores increases. Hence, a better energy yield can be achieved by a deeper discharge.

It is also advantageous for the electrical component to be connected, in terms of energy, in parallel by means of the circuit arrangement with an energy unit, in particular a rechargeable battery of a motor vehicle, by means of the circuit arrangement. After the electrical component has been disconnected by the circuit arrangement, said electrical component can be connected to a rechargeable battery of a motor vehicle by means of the circuit arrangement. Hence, by means of the method, the electrical component, in particular the energy store, is firstly supplied with electrical energy, wherein the stored electrical energy in the energy store can be connected to the rechargeable battery of the motor vehicle in order to increase the capacity of said rechargeable battery. It is also conceivable for the rechargeable battery of the motor vehicle to be used as electrical component for the startup process of the fuel cell arrangement. It is possible to use the method not only for the startup of the fuel cell arrangement during a frozen startup but also for keeping the fuel cell arrangement warm, in particular in a motor vehicle when traveling downhill or on a winter journey at low power, for example.

It has proven to be advantageous that, in the case of a voltage, detected by measuring device, of the electrical component, in particular a double-layer capacitor, of 2.5 V and particularly preferably of 2.7 V, the electrical component is isolated in terms of energy from the fuel cell arrangement. The isolation of the electrical component from the fuel cell arrangement in the event of a specific voltage drop ensures a controlled and safe operation of the electrical component. In this way, for example, a supercapacitor can be used as electrical component, which supercapacitor can have a rated voltage of 2.5 V to 2.7 V. In order that the supercapacitor is not destroyed, said supercapacitor can be disconnected in a controlled manner from the fuel cell arrangement when the rated voltage is reached.

BRIEF DESCRIPTION OF THE DRAWINGS

Further measures and advantages of the invention emerge from the claims, the following description and the drawings. The invention is illustrated in multiple examples in the drawings. The features mentioned in the claims and in the description can be essential to the invention in each case on their own or in any combination. In the drawings:

DETAILED DESCRIPTION

Figure 1:
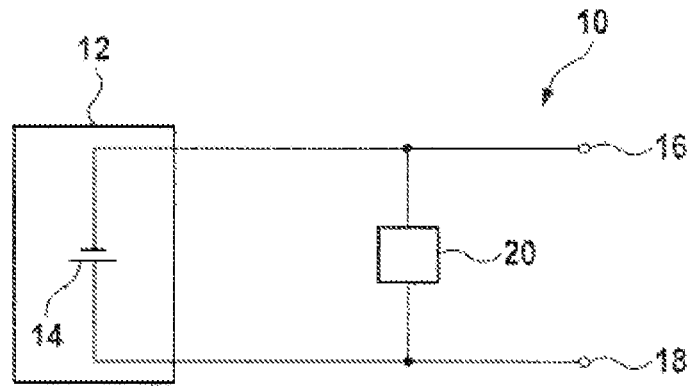
FIG. 1 shows a schematic view of an energy system having a fuel cell arrangement and an electrical component.

FIG. 1 illustrates a schematic view of an energy system 10, wherein the energy system 10 has a fuel cell arrangement 12 and an electrical component 20. The fuel cell arrangement has a fuel cell 14. The electrical component 20 is in this case connected to the fuel cell arrangement 12 at a first electrical contact 16 and at a second electrical contact 18. Thus, the electrical component 20 can be supplied with electrical energy via the fuel cell arrangement 12 in terms of energy. In this case, the electrical component 20 can be an energy store, in particular a capacitor or a rechargeable battery, which can be charged by means of the fuel cell arrangement 12.

Figure 2:
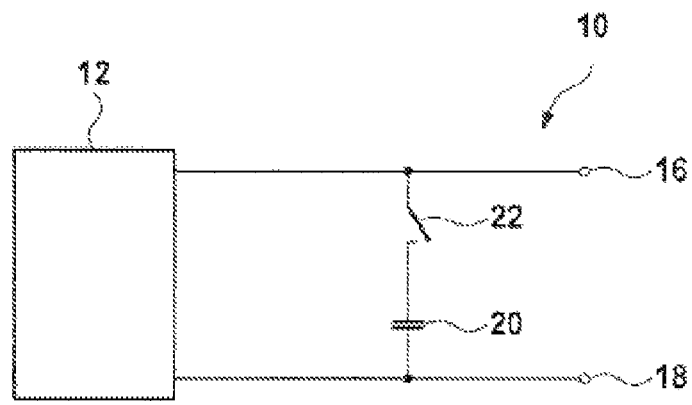
FIG. 2 shows a schematic arrangement of an energy system having a fuel cell arrangement, an isolating switch and an electrical component which is embodied as a capacitor.

FIG. 2 illustrates a schematic view of an energy system 10, wherein the energy system 10 has a fuel cell arrangement 12. An electrical component 20 is connectable to the fuel cell arrangement 12 by means of a switch 22. The electrical component 20 is a capacitor, wherein the capacitor 20 is connectable to the fuel cell arrangement 12 by means of the electrical switch 22. When the capacitor 20 is connected to the fuel cell arrangement 12, said capacitor can be charged electrically. In order to increase the electrical voltage which can be applied to the electrical component 20, a plurality of capacitors 20 can be connected in series. A combined series and parallel circuit of electrical capacitors 20 is also conceivable in this case. Here, the electrical energy of the fuel cell arrangement 12 can be tapped off via a first electrical contact 16 and a second electrical contact 18.

Figure 3:
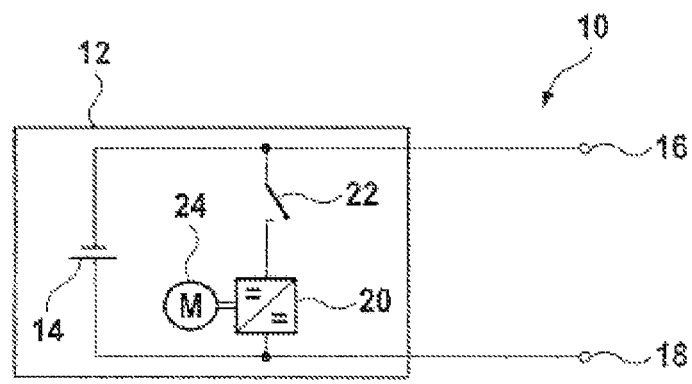
FIG. 3 shows a schematic view of an energy system having a fuel cell arrangement, wherein the fuel cell arrangement has an air compressor.

FIG. 3 schematically illustrates an energy system 10, wherein the energy system 10 has a fuel cell arrangement 12. Electrical energy can be tapped off from the fuel cell arrangement 12 via a first electrical contact 16 and a second electrical contact 18. In this case, the fuel cell arrangement 12 has a fuel cell 14, wherein an air compressor 24 is connectable in parallel with the fuel cell 14 by means of a switch 22. The air compressor 24 is in this case driven by a DC-DC converter, wherein the DC-DC converter is connectable to the fuel cell 14 by means of the switch 22. The air compressor can be used to operate the fuel cell arrangement 12.

Figure 4:
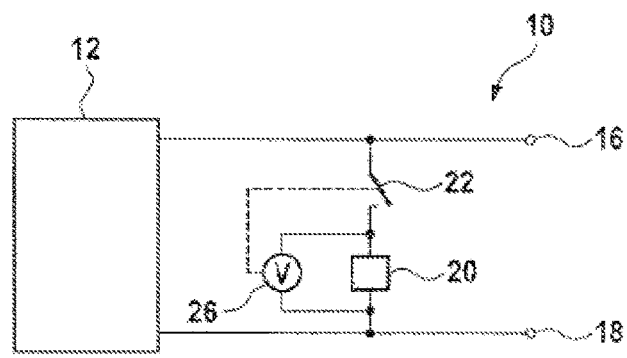
FIG. 4 shows a schematic view of an energy system having a fuel cell arrangement, wherein the electrical component of the fuel cell arrangement is connectable and disconnectable by means of a switch.

FIG. 4 schematically illustrates an energy system 10, wherein the energy system 10 has a fuel cell arrangement 12. Electrical energy can be tapped off from the fuel cell arrangement 12 via a first electrical contact 16 and a second electrical contact 18. An electrical component 20 is connectable to the first electrical contact 16 and the second electrical contact 18 by means of an electrical switch 22. The voltage drop across the electrical component 20 is monitored by means of a measuring device 26, in particular a voltmeter. The switch 22 can be controlled by means of the measuring device 26. In this case, in particular in a motor vehicle, the control of the switch 22 can take place via a fieldbus. In this case, the fieldbus can be configured as a CAN or LIN system. Correspondingly, the switch 22 can be connected, via a control unit, to the measuring device 26, via the fieldbus. In this case, the measuring device 26 can likewise be connected to the fieldbus via a control device. In this way, data can be transmitted from the measuring device 26 to the control unit of the switch 22 via the fieldbus. In the event that a specific voltage across the electrical component 20 is reached, a signal can be sent to the control device of the switch 22 via the control device of the measuring device 26, whereupon said switch isolates the electrical component 20 in terms of energy from the fuel cell arrangement 12. Alternatively, an analog signal can also be generated directly by the voltmeter which opens the switch. Thus, it is possible to prevent the electrical component 20 from being destroyed by too high a voltage drop across the electrical component 20. In particular in the case of use of the electrical component 20 as capacitor or as supercapacitor or as rechargeable battery, destruction of the electrical component 20 can be obviated.

Figure 5:
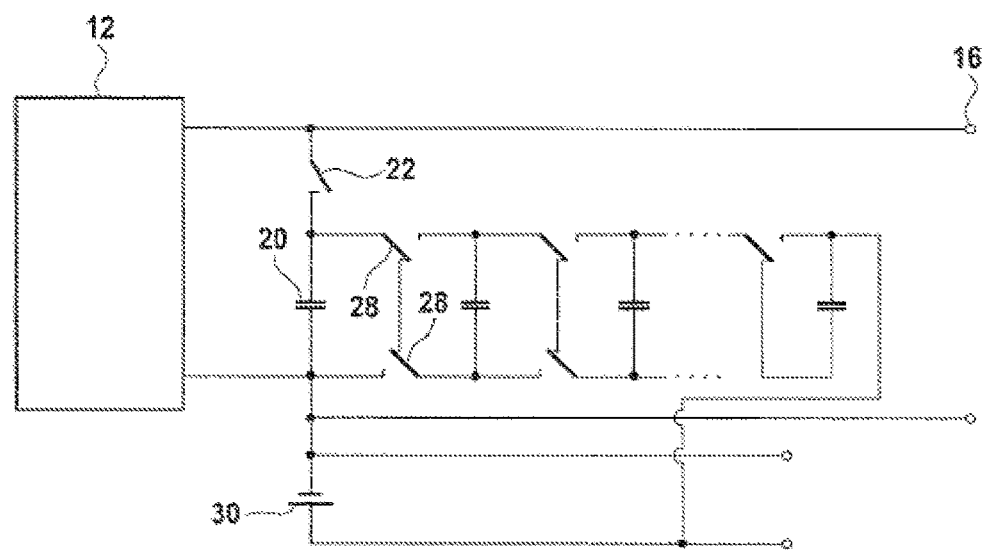
FIG. 5 shows a schematic view of an energy system, wherein a parallel circuit of electrical components is connectable into a series circuit by means of a circuit arrangement.

FIG. 5 schematically illustrates an energy system 10, wherein the energy system 10 has a fuel cell arrangement 12. Electrical energy can be tapped off at the fuel cell arrangement 12 via a first electrical contact 16 and a second electrical contact 18. A plurality of electrical components 20 are connectable by means of a switch 22. The electrical components 20 are illustrated in FIG. 5 as five capacitors, wherein the number of capacitors can be chosen freely. In this case, the capacitors 20 are connectable optionally in a parallel or a series circuit via a circuit arrangement 28. In the case of a frozen startup of the fuel cell arrangement 12, the capacitors are connectable in parallel by means of the switch 22 and the circuit arrangement 28. Owing to the parallel circuit of the capacitors, the total capacitance of the electrical component 20 increases, as a result of which a higher development of heat of the fuel cell arrangement 12 occurs when the parallel-connected capacitors are being charged by the fuel cell arrangement 12. Once the capacitors 20 are charged up, the capacitors 20 are isolated from the first electrical contact 16 by means of the switch 22. In order to be able to use the stored energy of the electrical capacitors through a higher voltage, said capacitors can be connected in a series circuit via the circuit arrangement 28. The electrical circuit arrangement 28 can in this case be connected to a starter battery 30 via a switch to the series-connected capacitors. The starter battery 30 can be used, in particular, in a motor vehicle, wherein the starter battery 30 can be a lead-acid rechargeable battery. Thus, the required electrical energy for heating the fuel cell arrangement 12 can be supplied to the energy system 10.

The invention claimed is:

1. An energy system, the energy system comprising:
   a fuel cell arrangement, wherein the fuel cell arrangement has at least one fuel cell and the fuel cell arrangement has at least one first electrical contact and at least one second electrical contact for tapping off electrically generated energy of the fuel cell arrangement;
   at least two electrical components configured to release thermal energy and directly warm the fuel cell arrangement with the released thermal energy, wherein the at least two electrical components are electrically connectable between the first electrical contact and the second electrical contact, wherein at least some of the electrical energy flow which is necessary to release the thermal energy is fed back to the energy system by the at least two electrical components; and
   a measuring device configured to detect an electrical voltage at the electrical component,
   wherein the at least two electrical components are connectable to and disconnectable from the first electrical contact in terms of energy by means of at least one switch,
   wherein the at least two electrical components are initially connected in parallel with the fuel cell arrangement via the at least one switch,
   wherein the at least two electrical components are disconnected in terms of energy from the first electrical contact by the at least one switch at a specific electrical voltage, and
   wherein the at least two electrical components are connected in series via a circuit arrangement for feeding the electrical energy flow back to the energy system when the at least two electrical components are disconnected from the first electrical contact.

2. The energy system according to claim 1, wherein the energy required for warming up the fuel cell arrangement is fed back by the at least two electrical components in a heat-free manner.

3. The energy system according to claim 1, wherein the at least two electrical components are energy stores.

4. The energy system according to claim 3, wherein the at least two electrical components are connectable in series by means of the circuit arrangement in order to increase an outputtable voltage.

5. The energy system according to claim 1, wherein the at least two electrical components have an air compressor, wherein the air compressor is usable for operating the fuel cell arrangement.

6. A method for using generated electrical energy of an energy system, the method comprising:
   electrically and conductively connecting at least two electrical components to a fuel cell arrangement by a switch, wherein the fuel cell arrangement has at least one fuel cell and the fuel cell arrangement has at least one first electrical contact and at least one second electrical contact for tapping off electrically generated energy of the fuel cell arrangement, and wherein the at least two electrical components are configured to release thermal energy and directly warm up the fuel cell arrangement with the released thermal energy, wherein the electrical component is electrically connectable between the first electrical contact and the second electrical contact, wherein at least some of the electrical energy flow which is necessary to release the thermal energy is fed back to the energy system by the at least two electrical components;
   detecting an electrical voltage at the at least two electrical components by a measuring device;
   at a specific electrical voltage, disconnecting the at least two electrical components in terms of energy from the at least one first electrical contact by the switch; and
   connecting the at least two electrical components in series via a circuit arrangement for feeding the electrical energy flow back to the energy system.

7. The method according to claim 6, wherein the at least two electrical components are capacitors.

8. The method according to claim 7, wherein the at least two electrical components are connected, in terms of energy, in parallel by means of the circuit arrangement with an energy unit by means of the circuit arrangement.

9. The method according to claim 6, wherein in the case of a voltage, detected by the measuring device of the at least two electrical components of about 2.5 volts or more, the at least two electrical components are isolated in terms of energy from the fuel cell arrangement.

* * * * *